United States Patent [19]

Betulius

[11] 3,976,231
[45] Aug. 24, 1976

[54] HAND-PROPELLED CHEMICAL APPLICATOR

[75] Inventor: Gilbert E. Betulius, Evansville, Ind.

[73] Assignee: Chem-Farm Inc., Evansville, Ind.

[22] Filed: Oct. 10, 1974

[21] Appl. No.: 513,731

[52] U.S. Cl. ............................... 222/177; 222/318; 239/157; 239/127
[51] Int. Cl.² .................... A01C 15/00; B05B 9/06
[58] Field of Search ................ 222/176, 177, 318; 239/157, 127

[56] References Cited
UNITED STATES PATENTS

| | | | |
|---|---|---|---|
| 1,497,637 | 6/1924 | Polk et al. | 222/177 |
| 1,530,855 | 3/1925 | Saladiner | 239/157 |
| 1,638,758 | 8/1927 | Boyett | 239/157 X |
| 2,169,514 | 8/1939 | Buzzard et al. | 239/127 X |
| 2,252,872 | 8/1941 | Spreng | 239/157 X |
| 2,317,288 | 4/1943 | McCubbin | 222/177 X |
| 2,515,865 | 7/1950 | Fisher | 239/157 |
| 2,692,798 | 10/1954 | Hicks | 239/127 X |
| 2,757,044 | 7/1956 | Gerbracht | 239/157 X |
| 3,515,313 | 6/1970 | Siems | 222/177 |
| 3,677,446 | 7/1972 | Guyer, Jr. et al. | 222/177 |
| 3,826,426 | 7/1974 | Bonvicini | 239/127 |

*Primary Examiner*—Allen N. Knowles
*Attorney, Agent, or Firm*—Olson, Trexler, Wolters, Bushnell & Fosse, Ltd.

[57] ABSTRACT

The embodiment of the invention disclosed herein is directed to a hand-propelled chemical applicator which dispenses liquid chemicals when the applicator is manually pushed over an area of ground to be treated. The applicator is a fluid-dispensing device having a support frame supported on the ground by a main wheel rotatably secured thereto. A pump is secured to the support frame and is selectively engageable with and driven by the main wheel to develop sufficient pressure to draw liquid chemicals from a reservoir and deliver the chemicals to two or more dispensing nozzles secured to the support frame. The pump produces sufficient pressure during a normal walking speed of an operator to provide substantially constant dispersion of the chemical. The chemicals within the reservoir are maintained in a mixed condition by providing a return fluid flow path of chemicals from a distribution manifold back to the reservoir through a separate return flow path.

3 Claims, 6 Drawing Figures

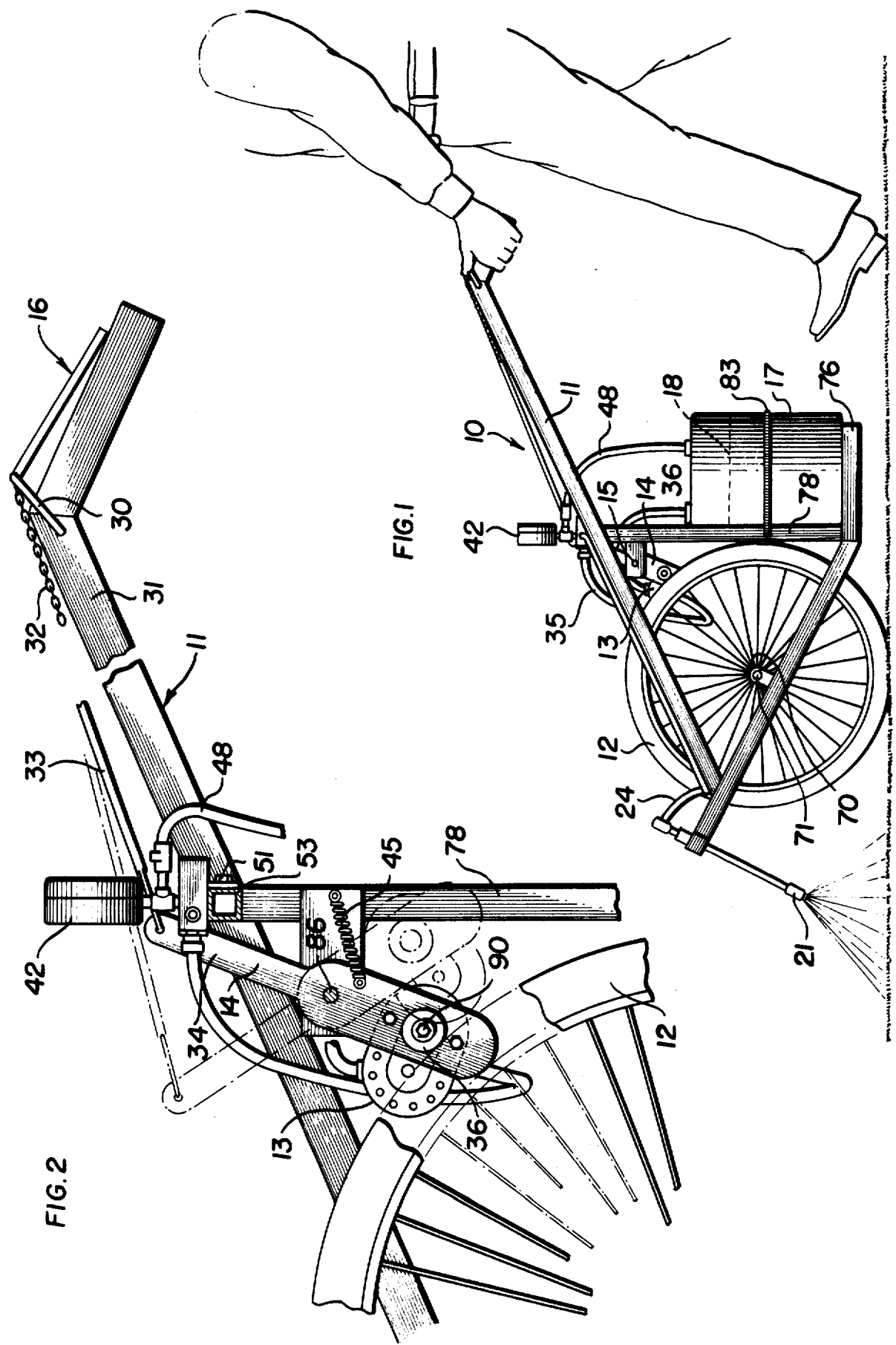

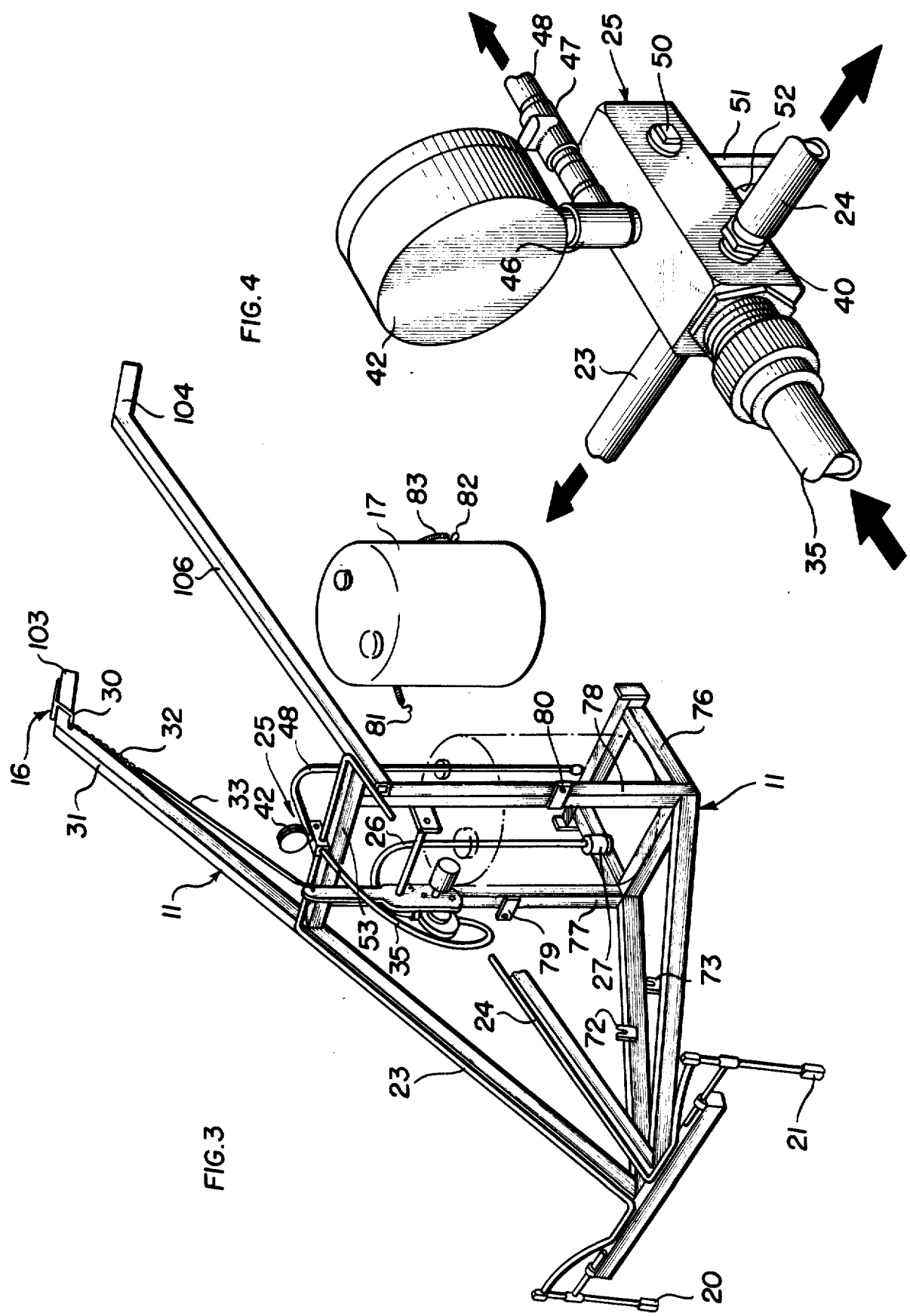

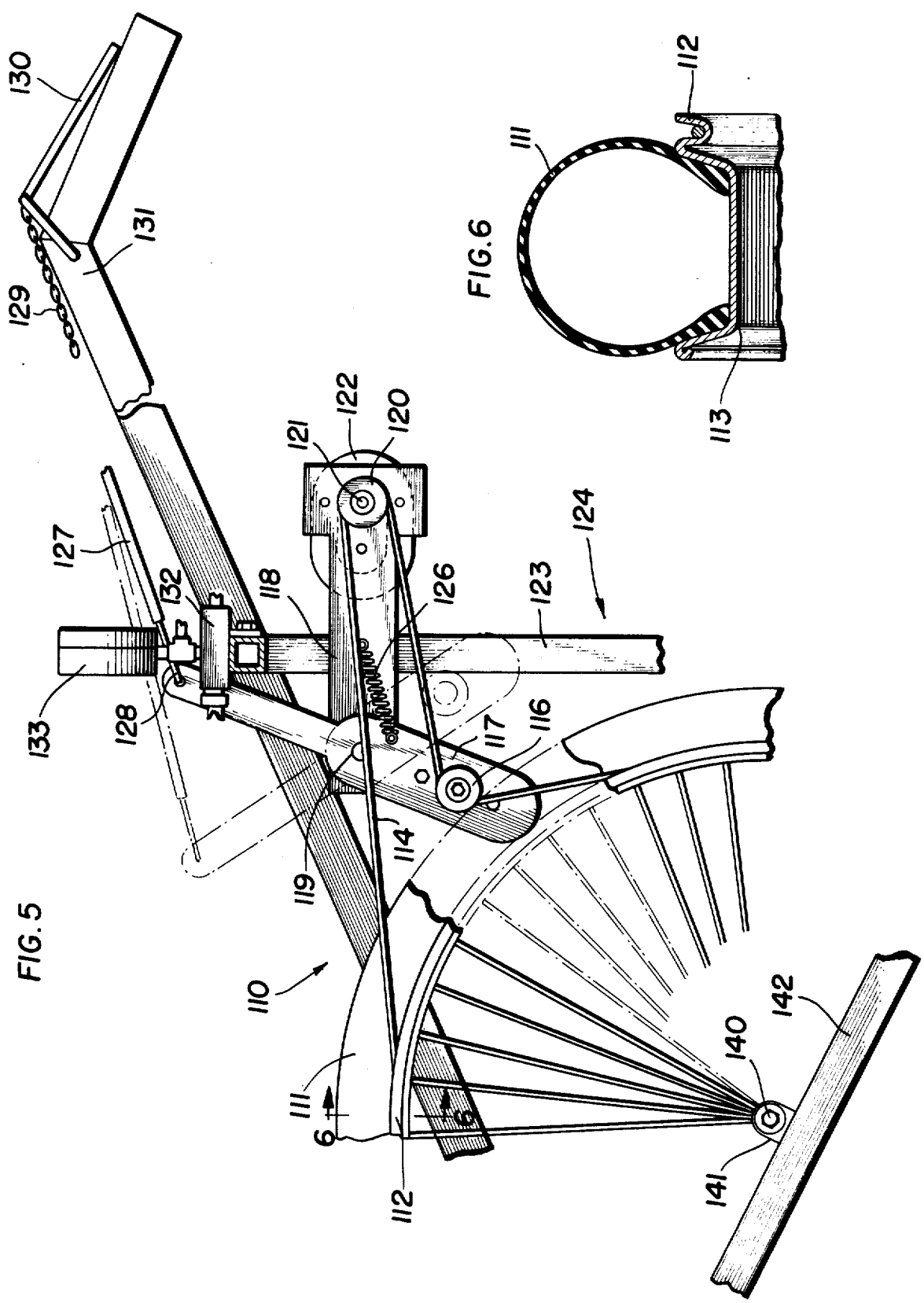

3,976,231

HAND-PROPELLED CHEMICAL APPLICATOR

BACKGROUND OF THE INVENTION

This invention relates generally to a fluid-dispensing device, and more particularly to a hand-propelled chemical applicator for applying chemicals to the ground for treating the soil, plants, and the like.

Heretofore, the chemical treatment of relatively small areas of ground, for the purpose of treating soil or plants and the like, has been accomplished by manual spraying of liquid chemicals either by the use of a pressurized tank or hand-operated pressure fed spray nozzles, carried by the user. While this type of equipment is useful for treating relatively small areas it is relatively cumbersome and heavy for treating larger areas for test purposes. Test beds, for agricultural purposes may be relatively large, but not large enough to warrant automated complicated equipment such as required by agricultural farmers, and therefore the use of manually operated semi-automatic equipment is desired. However, the cumbersome and heavy chemical dispensing equipment heretofore utilized would often fatigue the user.

SUMMARY OF THE INVENTION

Accordingly, it is an object of this invention to provide a new and improved chemical applicator for dispensing liquid chemicals over an area to be treated without requiring the operator to carry the dispensing equipment on his back.

Another object of this invention is to provide a new and improved fluid-dispensing device including a vehicle or support frame on one or more wheels which is hand-propelled over the area to be chemically treated.

Still another object of this invention is to provide a new and improved manually propelled chemical dispensing device for liquid chemicals having a supply tank and pump and means for providing a return fluid flow path back to a chemical tank so that there is mixing and agitation of 49 chemicals therein.

A feature of this invention is the utilization of a rotary drive pump having a belt sheave drive wheel selectively engageable with and driven by a main wheel of the manually propelled apparatus, such as a bicycle wheel or the like, to obtain the necessary pressure for dispensing of the liquid chemicals at normal walking speeds.

Still another feature of this invention is the utilization of a pump which provides increased pressure with increased walking speed so as to maintain a uniform density of distribution of the chemicals over the area being treated. This is accomplished by the fact that the main wheel is in contact with the ground and driven as the apparatus is pushed along a given path.

Many other objects, features and advantages of this invention will be more fully realized and understood from the following detailed description when taken in conjunction with the accompanying drawings wherein like reference numerals throughout the various views of the drawings are intended to designate similar elements or components.

BRIEF DESCRIPTION OF THE DRAWINGS

FIG. 1 is a side elevational view of a fluid-dispensing device constructed in accordance with this invention and further illustrates a user propelling the dispensing device over the ground;

FIG. 2 is an enlarged fragmentary sectional view showing one manner in which drive means for the pump of the apparatus may be selectively engaged with and disengaged from the vehicle wheel;

FIG. 3 illustrates a partially exploded perspective view of the support frame, reservoir and distribution fluid lines of the fluid-dispensing device of this invention;

FIG. 4 is an enlarged perspective fragmentary view of a fluid pressure gauge and built-in pressure relief valve arrangement for providing the return fluid flow path to the reservoir for continual mixing of the fluid during operation;

FIG. 5 is a side elevational view of an alternate form of construction of a fluid-dispensing device in accordance with the principles of this invention; and FIG. 6 is a sectional view taken along line 6—6 of FIG. 5.

DETAILED DESCRIPTION OF THE ILLUSTRATED EMBODIMENTS

Referring now to the drawing there is seen one form of fluid-dispensing device constructed in accordance with the principles of this invention and designated generally by reference numeral 10. The fluid-dispensing device 10 comprises a frame structure 11 which has a main wheel 12 rotatably secured thereto. The main wheel 12 supports the frame and rotates over the ground to be treated when the vehicle is manually propelled. A pump 13 having a drive shaft 90 is secured to an arm 14 pivotally supported by shaft 86 on the frame 11 for selective movement between forward and retracted positions shown respectively in solid and broken lines in FIG. 2. A drive wheel or roller 36 is secured to the pump shaft 90 for selective frictional engagement with the wheel 12 for driving the pump. An operating means 16 is mounted on the frame for shifting the arm 14 between the forward and retracted positions as described more in detail below.

A reservoir 17 is mounted on the frame 11 and contains a quantity of liquid chemical 18. The liquid is delivered to a pair of dispensing nozzles 20 and 21. As best seen in FIGS. 1 and 3, the nozzles 20 and 21 are secured to the support frame 11 at a position in front of the main wheel 12 and directed downwardly to disperse a spray of liquid chemical over the area to be treated. The dispensing nozzles 20 and 21 are in fluid communication with the reservoir 17 by means including flexible fluid lines 23 and 24 connected to a flow control distribution manifold and pressure regulator assembly 25. A conduit or fluid line 35 extends between the outlet of pump 13 and the inlet of the assembly 25 and the pump is in turn connected to the reservoir by an inlet line 26. The line 26 has a filter 27 secured to the end thereof. The type of liquid chemical used may vary with the desire of the user. However, the fluid-dispensing device 10 is intended primarily to be used for spraying small plots of ground such as research test plots, gardens, yards, tobacco, or roadways. It will be understood, also that the particular uses of the dispensing device 10 may vary as desired.

In the illustrated embodiment the pump engaging lever means 16 includes a pivotal lever 30 secured to a support arm 31 of the support frame 11 and includes a chain portion 32 having one end thereof secured to the pivotal arm 30 and the other arm thereof secured to a spring or resilient cord 33. The spring or resilient cord 33 has the other end secured to an extended arm portion 34 of the lever 14. When the pivotal control level 30 is moved forward the pivotal arm 14 is pivoted to the retracted position by a spring 45 so that the drive friction wheel 36 is disengaged from the peripheral surface of the main wheel 12. When the control lever 30 is pulled back the upper portion 34 of the arm 14 will urge the friction drive wheel 36 into firm engagement with the periphery of the main wheel 12 so that the pump 13 is driven.

During operation of the pump 13 fluid is drawn from the reservoir 17 through the strainer 27, fluid line 26 and pump 13 to be delivered through line 35 to a distribution manifold 40 which is part of the fluid flow control indicator 25, as best seen in FIG. 4. The liquid chemical flows through the manifold to the fluid lines 23 and 24 and nozzles 20 and 21, respectively. A pressure indicator gauge 42 is also connected with the manifold by coupling 46 in communication with the outlet lines 23 and 24. The gauge has an indicating face and pointer associated therewith of standard construction, not shown. In the embodiment shown in FIGS. 3 and 4 the coupling 46 is a T fitting coupled to a built-in pressure relief valve mechanism 47. In this embodiment the pressure within the lines 23 and 24 is maintained at a predetermined minimum value set by adjusting the relief valve which is of known construction or restrictive pressure-reducing orifice.

The capacity of the pump is such that it is capable of developing pressures in excess of the desired predetermined pressure and providing an excess fluid flow when an operator pushes the apparatus along the ground at a desired normal walking speed. Thus the desired minimum operating pressure is assured regardless of minor variations in the speed at which the operator walks. The excess fluid is released through the adjustable valve 47 and flows through a return line 48 back to the interior of the reservoir 17. Not only is the desired pressure maintained, but the return flow of excess liquids continuously agitates the mixture in the tank so as to assure that the proper mixture will be maintained.

The flow metered manifold control body 40 may include an inspection and cleaning plug 50 to enable residue, if accumulated, to be removed. The flow control body 40 includes a mounting tab 51 having an aperture 52 formed therein to facilitate bolting or otherwise fastening of the valve body to an upper support beam 53 of the support frame 11.

In the embodiment of FIGS. 1 and 2, the pump 13 has sufficient suction during normal walking speed of the user to create sufficient fluid flow from the reservoir 17 to the nozzles 20 and 21. For example, when the friction wheel 36 engages the periphery of the wheel 12 and the user walks at a normal speed of about 2 miles an hour, a 10 pound pressure will be developed within the pump 13. This will disperse 19 gallons of chemical solution per acre of area. However, should the user walk at a 2½ mile per hour rate, the pump speed is proportionally increased because of the direct drive from the ground wheel 12 and 10 pounds of pressure will be developed within the pump 13 and manifold system thereby still maintaining a 19 gallon per acre distribution. Similarly, at 3 miles per hour, 16 pounds of pressure will be developed with the system and this also will distribute 19 gallons of chemical solution per acre of area. Therefore, the pump and meter manifold distribution system provides substantially constant gallons of chemical solution per acre of area covered during normal walking speeds for various users.

The wheel 12 includes a hub portion 70 which is rotatably secured to the frame member 11 by an axle 71 retained within a pair of U-shaped brackets 72 and 73. The support frame 11 includes a bottom generally horizontally disposed tray or bracket porion 76 upon which rests the reservoir 17. Upwardly extending supports 77 and 78 have retaining brackets 79 and 80, respectively, secured thereto to receive hook portions 81 and 82, respectively, at the ends of a resilient spring-like member 83. The reservoir 17 is held in place upon the support pedestal 76 by means of the resilient cord 83. Therefore, the reservoir can be removed and replaced with another reservoir should there be a need for changing chemical solutions which cannot be intermixed.

To facilitate transporting the fluid-dispensing structure over the ground handle portion 103 and 104 are formed at the ends of the frame member 31 and a similarly fashioned frame member 106. The handles 103 and 104 may be provided with suitable grip means.

Referring now to FIGS. 5 and 6 there is seen an alternate embodiment of a chemical applicator constructed in accordance with the principles of this invention and designated generally by reference numeral 110. In this embodiment the applicator 110 has a main drive wheel 111 adapted to engage the ground over which the apparatus is transported. The main drive wheel 111 includes a large sheave 112. Preferably, the sheave or pulley 112 is secured to a rim 113 of the wheel 111 by suitable means such as spot-welding, brazing, riveting or the like. A rope or belt 114 is wrapped about the sheave 112 and over an idler pulley 116. The idler pulley 116 is secured to a pivotal arm 117 which, in turn, is pivotally secured to a support plate 118 by means of a pivot pin 119. The belt 114 is also wrapped about a friction wheel or pulley 120 secured to an output shaft 121 of a pump 122.

The support 118 is secured to a standard 123 of a frame structure designated generally by reference numeral 124. The support plate 118 therefore securely holds the pump 122 in a stationary position relative to the support frame 124. The arm 117 is maintained in the position shown in broken lines by means of a return spring 126.

A resilient cord 127 has one end 128 thereof secured to the arm 117 and the other end secured to a chain 129. The chain 129 is secured to a pivotal lever 130 located on a handle portion 131 of the support frame 124. The lever 130 operates substantially in the same manner as that of the lever 30 of FIG. 2.

Secured to the upper end of the standard 123 is a distribution manifold 132 and a gauge 133. The manifold and gauge are constructed and operate substantially in the same manner as that of the manifold and gauge 40 and 42 of FIG. 4. For purposes of clarity, the various interconnecting fluid lines are not illustrated in FIG. 5. However, it will be understood that the interconnection is substantially the same as that shown and described with regard to FIGS. 1, 2 and 3.

The wheel 111 is secured to the support frame 124 by means of an axle 140 passing through spaced apart lugs 141 formed on a supprt frame member 142.

In operation, the lever 130 is pulled back to pivot arm 117 about its pivot point 119. This will cause the idler pulley 116 to take up slack in the belt 114 and cause the belt frictionally to engage the wheel pulley 112 and the pulley 120 for driving the pump. When the lever 130 is released the pivotal arm 117 will be returned to its neutral position by the spring 126 thereby providing slack in the belt 114 and disengaging the pump 122.

What has been described is a simple and efficient hand-propelled chemical applicator used for distributing liquid chemicals through spray nozzles as the apparatus is pushed over the plot of ground to be treated. While the liquid chemical applicator of this invention has a particular utility when used in conjunction with research test plots, gardens, tobacco, and roadways, it will be understood that the apparatus may be used in other allied fields without departing from the spirit and scope of the novel concepts of this invention. While several specific embodiments of the invention have been disclosed herein it will be understood that other variations and modifications to the structure may also be incorporated without departing from the novel concepts of this invention.

The invention is claimed as follows:

1. A fluid dispensing apparatus comprising a manually propelled vehicle including a frame and a ground engaging wheel supporting said frame, a reservoir for containing a quantity of fluid to be dispensed mounted on said frame, pump means having an inlet communicating with a lower portion of said reservoir and an outlet, said pump having a capacity for delivering fluid in excess of the amount of fluid to be dispensed, dispensing nozzle means in communication with said outlet of said pump means for distributing the fluid while the vehicle is being propelled over an area to be treated, recirculating means in fluid communication with said outlet of said pump means for delivering excess fluid which is not dispensed back to said lower portion of said reservoir for mixing with the fluid remaining in said reservoir, a member shiftably mounted on said frame for movement between forward and retracted positions, said pump means being mounted on said member and including a drive wheel engageable with and frictionally driven directly by said ground wheel when said member is in said forward position, said drive wheel being disengaged from said ground wheel when said member is in said retracted position.

2. The fluid-dispensing apparatus as set forth in claim 1 wherein said recirculating means includes a pressure adjustable valve in fluid communication with said outlet.

3. A fluid-dispensing apparatus as defined in claim 1 wherein said support frame includes handle means extending rearwardly from said wheel for facilitating manual operation of the vehicle.

* * * * *